US 12,043,277 B2

(12) United States Patent
Honda

(10) Patent No.: US 12,043,277 B2
(45) Date of Patent: *Jul. 23, 2024

(54) VEHICLE DRIVING SUPPORT DEVICE

(71) Applicant: TOYOTA JIDOSHA KABUSHIKI KAISHA, Toyota (JP)

(72) Inventor: Masaaki Honda, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/455,440

(22) Filed: Aug. 24, 2023

(65) Prior Publication Data

US 2023/0399007 A1 Dec. 14, 2023

Related U.S. Application Data

(63) Continuation of application No. 17/403,184, filed on Aug. 16, 2021, now Pat. No. 11,780,459.

(30) Foreign Application Priority Data

Nov. 19, 2020 (JP) ................. 2020-192330

(51) Int. Cl.
| B60W 50/16 | (2020.01) |
| B60W 30/12 | (2020.01) |
| B60W 40/08 | (2012.01) |
| B60W 40/109 | (2012.01) |
| B60W 50/14 | (2020.01) |

(52) U.S. Cl.
CPC ............ *B60W 50/16* (2013.01); *B60W 30/12* (2013.01); *B60W 40/08* (2013.01); *B60W 40/109* (2013.01); *B60W 2040/0818* (2013.01); *B60W 2050/143* (2013.01); *B60W 2050/146* (2013.01); *B60W 2540/223* (2020.02)

(58) Field of Classification Search
CPC ................. B60W 50/16; B60W 30/12; B60W 2040/0818; B60W 2050/143; B60W 2050/146; B60W 2540/223
See application file for complete search history.

(56) References Cited

U.S. PATENT DOCUMENTS

| 8,996,234 B1 | 3/2015 | Tamari et al. |
| 2002/0041229 A1 | 4/2002 | Satoh et al. |

(Continued)

FOREIGN PATENT DOCUMENTS

| EP | 0 119 484 A1 | 2/1984 |
| JP | 2002-079895 A | 3/2002 |

(Continued)

OTHER PUBLICATIONS

Office Action mailed Aug. 5, 2022 in co-pending U.S. Appl. No. 17/403,184.

(Continued)

*Primary Examiner* — Nabil H Syed
*Assistant Examiner* — Cal J Eustaquio
(74) *Attorney, Agent, or Firm* — Sughrue Mion, PLLC

(57) ABSTRACT

A vehicle driving support device issues an alert to notify a driver of a vehicle that there is a possibility of occurrence of a situation in which the vehicle is not able to travel along a lane. The vehicle driving support device issues an alert when an alert condition that a rate of increase in a lateral acceleration of the vehicle is equal to or larger than a predetermined rate of increase is satisfied.

6 Claims, 5 Drawing Sheets

(56) References Cited

U.S. PATENT DOCUMENTS

| | | |
|---|---|---|
| 2002/0095246 A1 | 7/2002 | Kawazoe |
| 2005/0096828 A1 | 5/2005 | Uemura et al. |
| 2010/0025144 A1 | 2/2010 | Huang et al. |
| 2018/0178839 A1 | 6/2018 | Ide |
| 2022/0153292 A1 | 5/2022 | Honda |

FOREIGN PATENT DOCUMENTS

| | | |
|---|---|---|
| JP | 2005-132184 A | 5/2005 |
| JP | 2008-13121 A | 1/2008 |
| JP | 2018-103862 A | 7/2018 |

OTHER PUBLICATIONS

Office Action mailed Feb. 14, 2023 in co-pending U.S. Appl. No. 17/403,184.
Notice of Allowance mailed May 25, 2023 in co-pending U.S. Appl. No. 17/403,184.

VEHICLE DRIVING SUPPORT DEVICE

CROSS-REFERENCE TO RELATED APPLICATIONS

This application is a continuation application of U.S. patent application Ser. No. 17/403,184, filed on Aug. 16, 2021, in U.S. Patent and Trademark Office, which claims priority to Japanese Patent Application No. 2020-192330, filed on Nov. 19, 2020, in the Japan Patent Office, the disclosures of which are incorporated by reference herein in their entireties.

BACKGROUND

1. Technical Field

The present disclosure relates to a vehicle driving support device.

2. Description of Related Art

A vehicle driving support device is known that issues an alert to notify a driver of a vehicle that the vehicle cannot travel along the lane. As the vehicle driving support device mentioned above, a vehicle driving support device is also known (see Japanese Unexamined Patent Application Publication No. 2002-79895 (JP 2002-79895 A), for example). The vehicle driving support device acquires by calculation the yaw rate of the vehicle required to be generated (required yaw rate) at that moment in order for the vehicle to reach the center point of the lane that is a predetermined distance forward of the vehicle. When a deviation of the current actual yaw rate from the required yaw rate is large, the vehicle driving support device determines that the vehicle cannot travel along the lane and issues an alert.

SUMMARY

The related-art vehicle driving support device mentioned above issues an alert when the deviation between the required yaw rate and the current actual yaw rate is large. Therefore, the alert is issued after the vehicle actually stops following the lane. However, there is a certain benefit in predicting that the vehicle will stop following the lane and notifying the driver of this with an alert before the vehicle actually stops following the lane.

An object of the present disclosure is to provide a vehicle driving support device capable of notifying a driver that there is a possibility of occurrence of a situation in which a vehicle is not able to travel along a lane.

A vehicle driving support device according to the present disclosure includes a control unit that issues an alert to notify a driver of a vehicle that there is a possibility of occurrence of a situation in which the vehicle is not able to travel along a lane. The control unit is configured to issue the alert when an alert condition that a rate of increase in a lateral acceleration of the vehicle is equal to or larger than a predetermined rate of increase is satisfied.

The vehicle driving support device according to the present disclosure uses the rate of increase in the lateral acceleration to determine whether to issue an alert. Therefore, it can be predicted that there is a possibility of occurrence of a situation in which the vehicle is going to travel on the road where a large lateral acceleration is generated and the vehicle is not be able to travel along the lane unless a large steering force is applied to the vehicle. When such a prediction is made, the alert is issued, so it is possible to notify the driver that there is a possibility of occurrence of a situation in which the vehicle is not able to travel along the lane.

In the vehicle driving support device according to the present disclosure, the control unit may be configured to set a level of the alert to be lower when a steering wheel operation by the driver is detected than when the steering wheel operation by the driver is not detected.

For example, when the driver is operating the steering wheel by themselves when the alert condition is satisfied, the driver must steer the vehicle by themselves such that the vehicle travels along the lane when the vehicle travels on the road where a large lateral acceleration is generated. In this case, issuing an alert may make the driver feel annoyed. In contrast, if the driver is not operating the steering wheel while looking aside, taking a nap, or taking their hands off the steering wheel, the alert is useful to the driver.

The vehicle driving support device according to the present disclosure sets the alert level to be lower when the steering wheel operation by the driver is detected than when the steering wheel operation by the driver is not detected. Thus, when the alert may make the driver feel annoyed, a low level alert is issued, and when issuing the alert is useful for the driver, a high level alert is issued. Therefore, it is possible to issue a useful alert while suppressing making the driver feel annoyed.

The alert condition may include a condition that a steering wheel operation by the driver is not detected. With this, when the steering wheel operation by the driver is detected, the alert is not issued. Thus, it is possible to issue a useful alert while suppressing making the driver feel annoyed.

The alert condition may include a condition that the lateral acceleration is equal to or larger than a predetermined lateral acceleration. This allows the alert to be issued only when the lateral acceleration is large and the rate of increase in the lateral acceleration is also large at that time and therefore a situation is likely to occur in which the vehicle is not able to travel along the lane.

The constituent elements of the present disclosure are not limited to the embodiment of the present disclosure described later with reference to the drawings. Other objects, other features and accompanying advantages of the present disclosure will be readily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram showing a road on which the vehicle equipped with the vehicle driving support device according to the embodiment of the present disclosure travels, and the like;

DETAILED DESCRIPTION OF EMBODIMENTS

Figure 1:
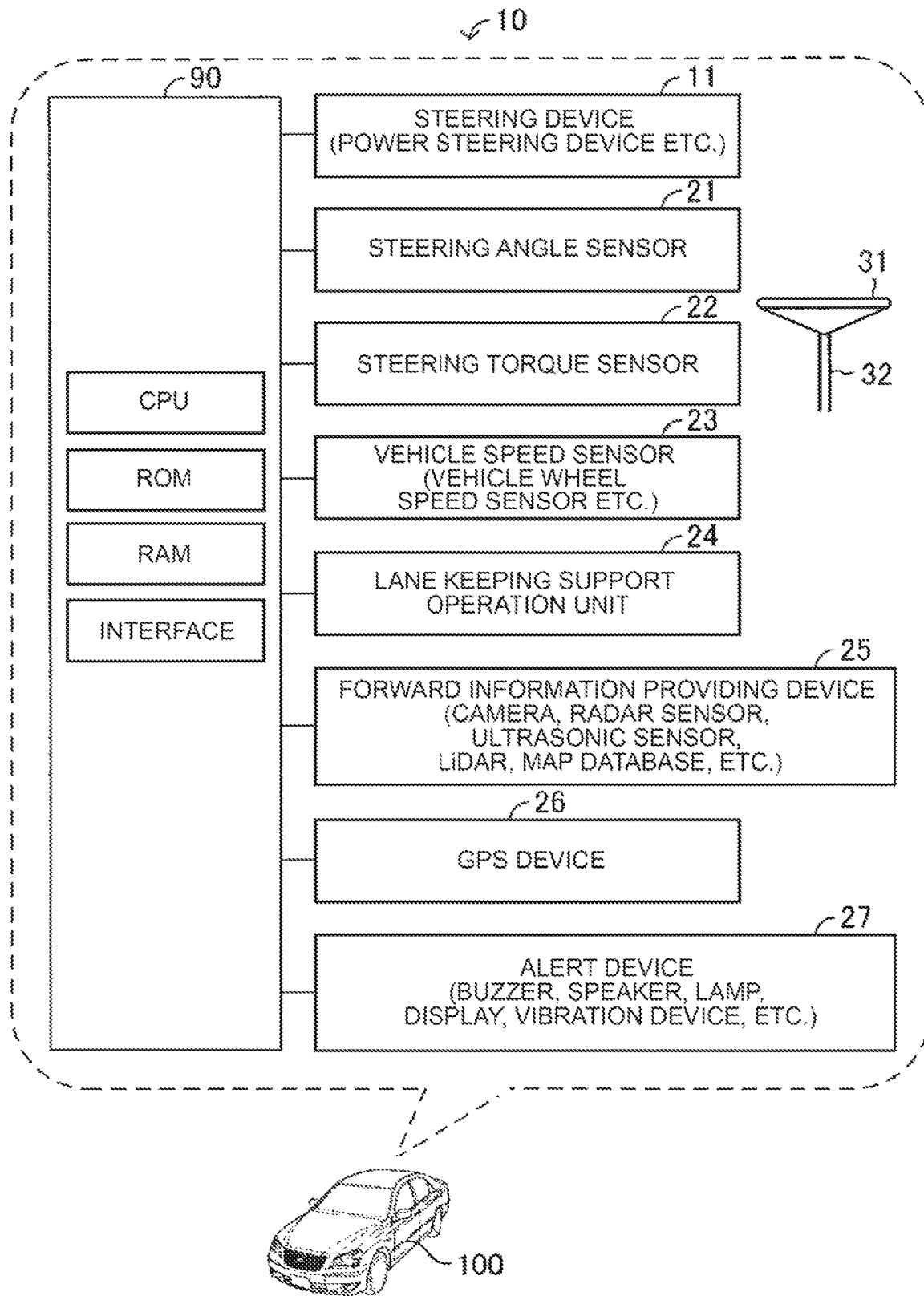
FIG. 1 is a diagram showing a vehicle driving support device according to an embodiment of the present disclosure and a vehicle equipped with the vehicle driving support device.

Hereinafter, a vehicle driving support device according to an embodiment of the present disclosure will be described with reference to the drawings. FIG. 1 shows a vehicle driving support device 10 according to the embodiment of the present disclosure and a vehicle 100 equipped with the vehicle driving support device 10.

ECU

The vehicle driving support device 10 includes an electronic control unit (ECU) 90. The ECU is an abbreviation for electronic control unit. The ECU 90 includes a microcomputer as a main component. The microcomputer includes a central processing unit (CPU), a read only memory (ROM), a random access memory (RAM), a non-volatile memory, an interface, and the like. The CPU realizes various functions by executing instructions, programs, or routines stored in the ROM.

Forward Information Providing Device, Etc.

The vehicle 100 is equipped with a steering device 11, a steering angle sensor 21, a steering torque sensor 22, a vehicle speed sensor 23, a lane keeping support operation unit 24, a forward information providing device 25, a Global Positioning System (GPS) device 26, and an alert device 27.

Steering Device

The steering device 11 is a device that outputs a steering force (steering torque) applied to the vehicle 100 to steer the vehicle 100, and is, for example, a power steering device. The steering device 11 is electrically connected to the ECU 90. The ECU 90 can control the steering force output from the steering device 11 by controlling the operation of the steering device 11.

Steering Angle Sensor and Steering Torque Sensor

The steering angle sensor 21 is a sensor that detects a rotation angle of a steering wheel 31 (or a steering shaft 32) with respect to the neutral position. The steering angle sensor 21 is electrically connected to the ECU 90. The steering angle sensor 21 transmits information on the detected rotation angle of the steering wheel 31 to the ECU 90. The ECU 90 acquires the rotation angle of the steering wheel 31 as a steering angle θ based on the information.

The steering torque sensor 22 is a sensor that detects the torque input to the steering shaft 32 via the steering wheel 31. The steering torque sensor 22 is electrically connected to the ECU 90. The steering torque sensor 22 transmits information of the detected torque to the ECU 90. Based on the information, the ECU 90 acquires the torque input to the steering shaft 32 via the steering wheel 31 as a steering torque TQ.

The ECU 90 acquires by calculation a required steering force (required steering torque) from the steering angle θ and the steering torque TQ. Alternatively, the ECU 90 corrects the calculated required steering force as necessary to acquire a corrected required steering force (corrected required steering torque) while a lane keeping support control described later is being executed. The required steering force and the corrected required steering force are steering forces for which output is required of the steering device 11. The ECU 90 controls the operation of the steering device 11 so that the required steering force or the corrected required steering force is output. Further, the ECU 90 can determine whether the operation of the steering wheel 31 by the driver (steering wheel operation of the driver) is being performed, from the steering angle θ, the steering torque TQ, and the like.

Vehicle Speed Sensor

The vehicle speed sensor 23 is a device that detects the vehicle speed of the vehicle 100, and has, for example, a wheel speed sensor. The vehicle speed sensor 23 is electrically connected to the ECU 90. The vehicle speed sensor 23 transmits information on the detected vehicle speed of the vehicle 100 to the ECU 90. The ECU 90 acquires the vehicle speed of the vehicle 100 as a vehicle speed Vown based on the information.

Lane Keeping Support Operation Unit

The lane keeping support operation unit 24 is a device operated by the driver of the vehicle 100 in order to request the execution of the lane keeping support control described later as the vehicle driving support control, and has at least one of a button, a switch, and the like, for example. The lane keeping support operation unit 24 is electrically connected to the ECU 90. When a predetermined operation requesting execution of the lane keeping support control is performed, the lane keeping support operation unit 24 transmits a signal corresponding to the predetermined operation to the ECU 90. When the ECU 90 receives the signal, the ECU 90 determines that the execution of the lane keeping support control is requested.

Forward Information Providing Device

The forward information providing device 25 is a device that provides information forward of the vehicle 100, and has at least one of "a sensor such as a camera, a radar sensor (millimeter wave radar, and the like), an ultrasonic sensor (clearance sonar), and a laser radar (light detection and ranging (LiDAR))" and "a road shape database such as a map database", for example.

The forward information providing device 25 is electrically connected to the ECU 90. The forward information providing device 25 provides information forward of the vehicle 100 (forward information) to the ECU 90. From the forward information, the ECU 90 acquires the curvature of the road on which the vehicle 100 is traveling, more specifically, the curvature of the road forward of the vehicle 100, as a forward road curvature R. In particular, the ECU 90 acquires the curvature of a lane LN (see FIG. 2) in which the vehicle 100 is traveling, more specifically, the curvature of the lane LN forward of the vehicle 100, as the forward road curvature R.

For example, when the forward information providing device 25 has a camera, the forward information is information of an image in front of the vehicle 100 captured by the camera. In this case, the ECU 90 detects "a lane marking LM such as a white line provided on the road forward of the vehicle 100 (see FIG. 2)" from the information of the image, and acquires the forward road curvature R from the shape of the detected lane marking LM. Further, the ECU 90 detects, from the information of the image, at least one of objects that take a shape along the road shape, such as "the trajectory of another vehicle (preceding vehicle and/or vehicle alongside) traveling in front of the vehicle 100 on the same road as the road on which the vehicle 100 is traveling", "a guard rail GR installed on the road forward of the vehicle 100 (see FIG. 2)", and "an outer wall or a fence of a building BD on the side of the road forward of the vehicle 100 (see FIG. 2)", and acquires the forward road curvature R from the detected shape of the object.

When the forward information providing device 25 has a sensor, the forward information is object information such as "time from the time the sensor emits an electromagnetic wave or a sound wave to the time the sensor receives the reflected wave of the electromagnetic wave or the sound wave from the object" and "the direction in which the sensor receives the reflected wave of the electromagnetic wave or the sound wave". From the object information, the ECU 90 detects at least one of the objects that take a shape along the road shape, such as "the guard rail GR installed on the road forward of the vehicle 100 (see FIG. 2)", and "the outer wall or the fence of the building BD on the side of the road forward of the vehicle 100 (see FIG. 2)", and acquires the forward road curvature R from the detected shape of the object.

When the forward information providing device 25 has a road information database, the forward information is road information stored in the road information database. The ECU 90 acquires the shape of the road forward of the vehicle 100 from the road information and the current position of the vehicle 100, and acquires the forward road curvature R from the shape of the road.

GPS Device

The GPS device 26 is a device that receives so-called GPS signals. The GPS device 26 is electrically connected to the ECU 90. The GPS device 26 transmits the received GPS signal to the ECU 90. The ECU 90 acquires the current position of the vehicle 100 based on the GPS signal.

Alert Device

The alert device 27 is a device that issues an alert to the driver of the vehicle 100, and has, for example, at least one of a buzzer, a speaker, a lamp, a display, a vibration device, and the like. The alert device 27 is electrically connected to the ECU 90. When an alert condition Calert, which will be described later, is satisfied, the ECU 90 issues an alert to the driver by operating the alert device 27.

When the alert device 27 has a buzzer, the alert is an output of an alert sound from the buzzer. When the alert device 27 has a speaker, the alert is an output of voice (announcement) from the speaker. When the alert device 27 is a lamp, the alert is lighting of the lamp. When the alert device 27 is a display, the alert is an indication of an announcement image on the display. When the alert device 27 is a vibration device, the alert is the vibration of the steering wheel 31 or the driver's seat by the vibration device.

Outline of Operations of Vehicle Driving Support Device

Next, the outline of the operations of the vehicle driving support device 10 will be described. The vehicle driving support device 10 issues an alert to notify the driver of the vehicle 100 that there is a possibility of occurrence of a situation in which the vehicle 100 is not able to travel along the lane LN when the predetermined alert condition Calert is satisfied.

The vehicle driving support device 10 may issue an alert when the alert condition Calert is satisfied, in the case where the driver of the vehicle 100 requests issuance of an alert, or regardless of whether the driver of the vehicle 100 requests issuance of an alert, or regardless of whether the lane keeping support control is being executed. However, in this example, an alert is issued when the alert condition Calert is satisfied during the execution of the lane keeping support control.

Lane Keeping Support Control

The lane keeping support control is a control of acquiring a centerline LC of the lane LN in which the vehicle 100 is traveling (see FIG. 2) from the forward information, correcting the required steering force as necessary so that the vehicle 100 travels along the centerline LC, and providing the corrected required steering force to the vehicle 100, to cause the vehicle 100 to travel along the centerline LC of the lane LN. In other words, the lane keeping support control is a control for causing the vehicle 100 to travel along the lane LN.

When determining that the execution of the lane keeping support control is requested, the vehicle driving support device 10 starts the lane keeping support control, and when determining that the execution of the lane keeping support control is no longer requested, the vehicle driving support device 10 ends (stops) the lane keeping support control.

Alert

The vehicle driving support device 10 acquires the rate of increase in a lateral acceleration Gy (lateral acceleration increase rate Rgy) during execution of the lane keeping support control. In this example, the vehicle driving support device 10 acquires by calculation the lateral acceleration Gy based on the forward road curvature R acquired from the forward information and the vehicle speed Vown of the vehicle 100, but the lateral acceleration Gy acquired by the vehicle driving support device 10 is not limited to this. For example, when the vehicle 100 is equipped with a lateral acceleration sensor, the vehicle driving support device 10 may acquire the lateral acceleration Gy detected by the lateral acceleration sensor to acquire the lateral acceleration increase rate Rgy based on the lateral acceleration Gy.

When the curvature of the road on which the vehicle 100 is traveling increases while the state in which the vehicle 100 is traveling along the lane LN is maintained, the lateral acceleration increase rate Rgy increases accordingly. Therefore, a large lateral acceleration increase rate Rgy indicates that the curvature of the road on which the vehicle 100 is traveling has increased. Therefore, when the lateral acceleration increase rate Rgy is large, the lateral acceleration Gy is expected to increase thereafter. If the lateral acceleration Gy becomes very large, the correction of the required steering force by the lane keeping support control may reach the limit, and as a result, a situation may occur in which the vehicle 100 is not be able to travel along the lane LN without the steering wheel operation by the driver, even under the lane keeping support control.

Thus, the vehicle driving support device 10 determines that the alert condition Calert is satisfied when the lateral acceleration increase rate Rgy becomes equal to or larger than a predetermined increase rate Rgy_th.

In this example, the vehicle driving support device 10 determines that the alert condition Calert is satisfied when the lateral acceleration increase rate Rgy becomes equal to or larger than the predetermined increase rate Rgy_th regardless of whether the driver of the vehicle 100 is operating the steering wheel 31. However, the vehicle driving support device 10 may determine that the alert condition Calert is satisfied when the lateral acceleration increase rate Rgy becomes equal to or larger than the predetermined increase rate Rgy_th while the driver of the vehicle 100 is not operating the steering wheel 31.

When the vehicle driving support device 10 determines that the alert condition Calert is satisfied, the vehicle driving support device 10 issues an alert. That is, when the alert condition Calert that the lateral acceleration increase rate Rgy is equal to or larger than the predetermined increase rate Rgy_th is satisfied, the vehicle driving support device 10 determines that there is a possibility of occurrence of a situation in which the vehicle 100 is not able to travel along the lane LN, and issues an alert.

Further, the vehicle driving support device 10 may stop the alert when the alert condition Calert is no longer satisfied, but in this example, the alert is stopped when the alert condition Calert is no longer satisfied and an alert end condition Cend that an elapsed time T from the start of the alert has reached a predetermined time Tth is satisfied.

Figure 2:
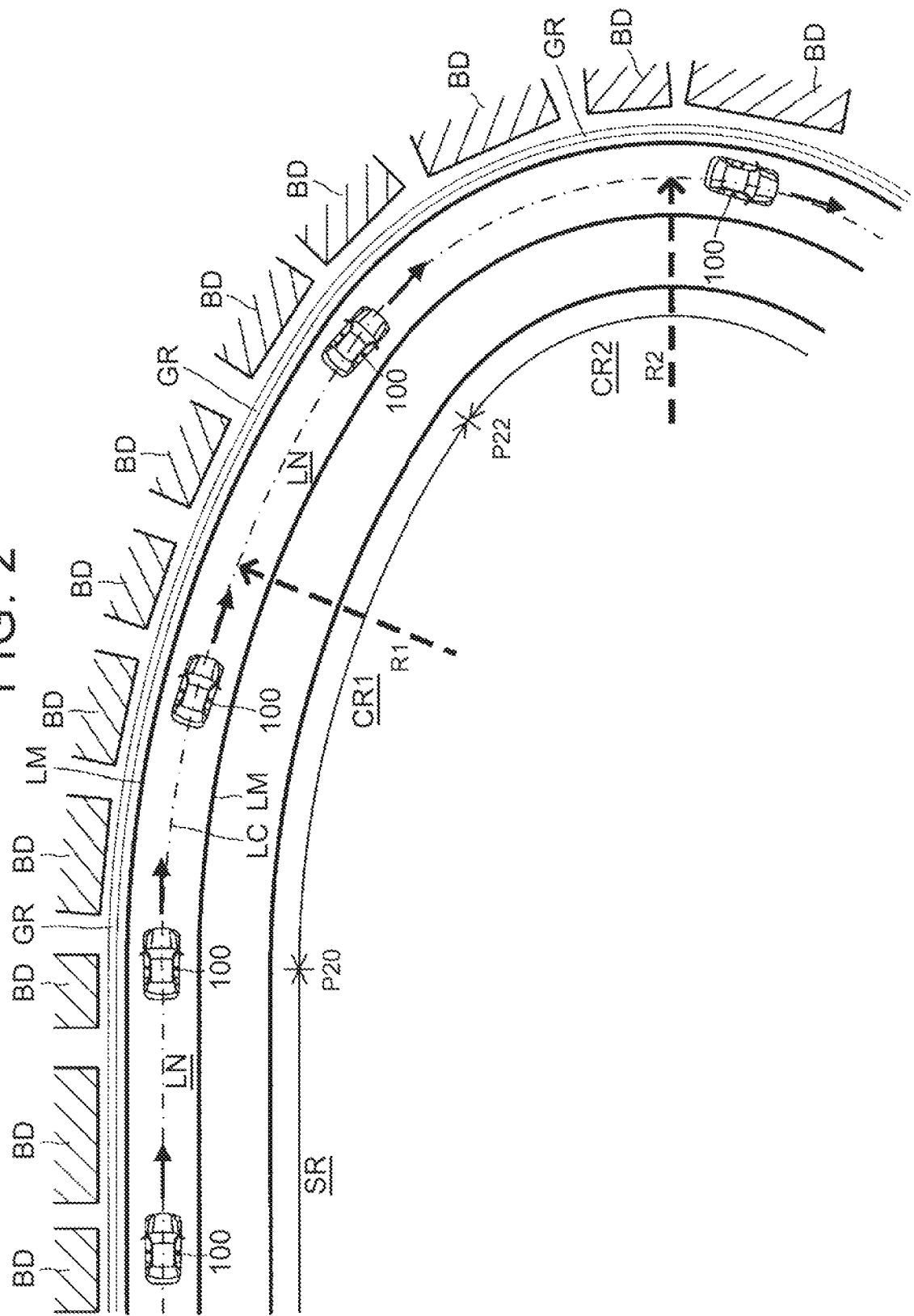

The operations of the vehicle driving support device 10 will be described with reference to FIGS. 2 and 3. In the example shown in FIG. 2, the road on which the vehicle 100 travels is a straight road SR with a curvature of the lane LN in which the vehicle 100 travels being zero up to a point P20. The road on which the vehicle 100 travels becomes a curved road CR1 with the curvature of the lane LN in which the vehicle 100 travels being a first curvature R1 at the point P20. Then, at a point P22, the road on which the vehicle 100 travels becomes a curved road CR2 with the curvature of the lane LN in which the vehicle 100 travels being a second curvature R2 that is larger than the first curvature R1.

Figure 3:
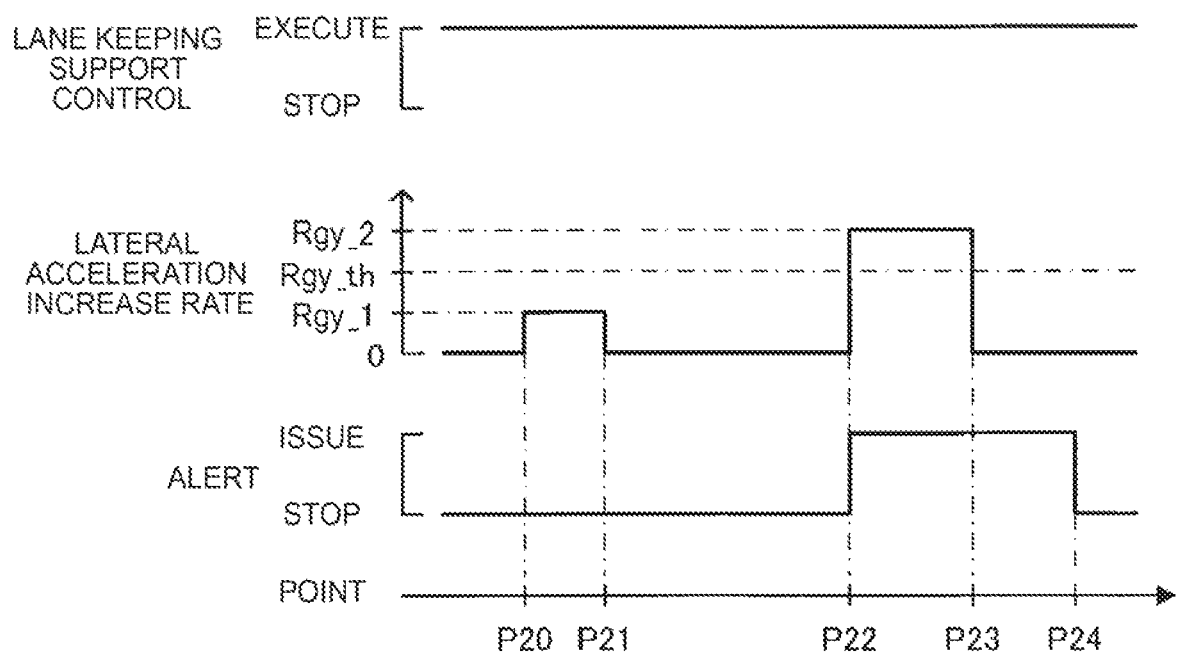
FIG. 3 is a time chart showing a lateral acceleration increase rate and the like when the vehicle equipped with the vehicle driving support device according to the embodiment of the present disclosure travels on the road shown in FIG. 2.

As shown in FIG. 3, the lateral acceleration increase rate Rgy acquired by the vehicle driving support device 10 is zero before the vehicle 100 reaches the point P20 (the point where the straight road SR shifts to the curved road CR1). When the vehicle 100 reaches the point P20, the lateral acceleration increase rate Rgy becomes a first increase rate Rgy_1. At this time, since the first increase rate Rgy_1 is smaller than the predetermined increase rate Rgy_th, no alert is issued.

After that, the lateral acceleration increase rate Rgy becomes zero when the vehicle 100 reaches a point P21. After that, when the vehicle 100 reaches a point P22 (the point where the curved road CR1 shifts to a curved road CR2), the lateral acceleration increase rate Rgy becomes a second increase rate Rgy_2. At this time, since the second increase rate Rgy_2 is larger than the predetermined increase rate Rgy_th, the alert is issued. After that, the alert is continued at least while the lateral acceleration increase rate Rgy is larger than the predetermined increase rate Rgy_th.

In this example, when the vehicle 100 reaches a point P23, the lateral acceleration increase rate Rgy becomes zero. At this point, the alert condition Calert is no longer satisfied, but the alert is continued because the elapsed time T from the start of the alert is shorter than the predetermined time Tth. After that, when the vehicle 100 reaches a point P24, the elapsed time T from the start of the alert reaches the predetermined time Tth and the alert end condition Cend is satisfied, so that the alert is ended.

Effects

The vehicle driving support device 10 uses the lateral acceleration increase rate Rgy to determine whether to issue an alert. Therefore, it can be predicted that the vehicle 100 is going to travel on the road where a large lateral acceleration Gy is generated and a large steering force needs to be applied to the vehicle 100 in order to cause the vehicle 100 to travel along the lane LN. In other words, it can be predicted that there is a possibility of occurrence of a situation in which the vehicle 100 is not able to travel along the lane LN unless a large steering force is applied to the vehicle 100. When such a prediction is made, the alert is issued, so it is possible to notify the driver that there is a possibility of occurrence of a situation in which the vehicle 100 is not able to travel along the lane LN.

In the above example, the alert condition Calert is a condition that the lateral acceleration increase rate Rgy is equal to or larger than the predetermined increase rate Rgy_th. However, the alert condition Calert may be a condition that the lateral acceleration increase rate Rgy is equal to or larger than the predetermined increase rate Rgy_th and the lateral acceleration Gy is equal to or larger than a predetermined lateral acceleration Gy_th. This allows the alert to be issued only when the lateral acceleration Gy is large and the increase rate Rgy is also large at that time and therefore a situation is likely to occur in which the vehicle 100 is not able to travel along the lane LN.

Specific Operations of Vehicle Driving Support Device

Figure 4:
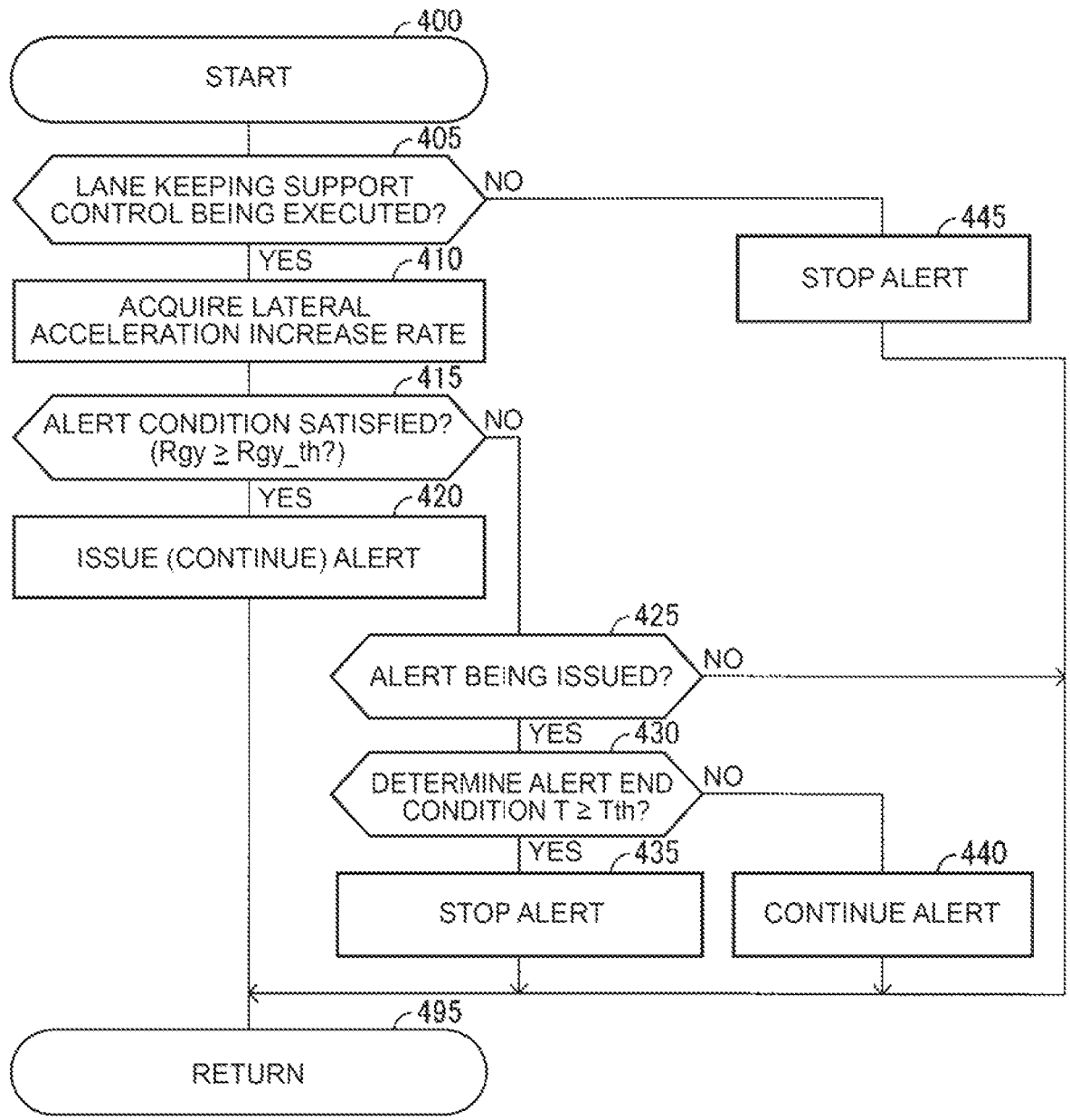
FIG. 4 is a flowchart showing a routine executed by the vehicle driving support device according to the embodiment of the present disclosure.

Next, the specific operations of the vehicle driving support device 10 will be described. The CPU of the ECU 90 of the vehicle driving support device 10 executes the routine shown in FIG. 4 every time a predetermined calculation time has elapsed. Thus, at a predetermined timing, the CPU starts the process from step 400 in FIG. 4, advances the process to step 405, and determines whether the lane keeping support control is being executed.

When the CPU determines "Yes" in step 405, the CPU advances the process to step 410 and acquires the lateral acceleration increase rate Rgy. Next, the CPU advances the process to step 415 and determines whether the alert condition Calert is satisfied. Specifically, the CPU determines whether the lateral acceleration increase rate Rgy acquired in step 410 is equal to or larger than the predetermined increase rate Rgy_th.

When the CPU determines "Yes" in step 415, the CPU advances the process to step 420. The CPU starts the alert when the alert is not being issued and continues the alert when the alert is being issued. Thereafter, the CPU advances the process to step 495 and temporarily ends the routine.

When the CPU determines "No" in step 415, the CPU advances the process to step 425 and determines whether the alert is being issued.

When the CPU determines "Yes" in step 425, the CPU advances the process to step 430 and determines whether the elapsed time T from the start of the alert is equal to or more than the predetermined time Tth.

When the CPU determines "Yes" in step 430, the CPU advances the process to step 435 and stops the alert. Thereafter, the CPU advances the process to step 495 and temporarily ends the routine.

When the CPU determines "No" in step 430, the CPU advances the process to step 440 and continues the alert. Thereafter, the CPU advances the process to step 495 and temporarily ends the routine.

When the CPU determines "No" in step 425, the CPU directly advances the process to step 495 and temporarily ends the routine.

When the CPU determines "No" in step 405, the CPU advances the process to step 445. The CPU stops the alert when the alert is being issued, and when the alert is not being issued, the CPU maintains the state in which the alert is not being issued. Thereafter, the CPU advances the process to step 495 and temporarily ends the routine.

The above is the specific operations of the vehicle driving support device 10.

Note that the present disclosure is not limited to the above embodiment, and various modifications can be adopted within the scope of the present disclosure.

Modifications

For example, when the driver is operating the steering wheel 31 by themselves when the alert condition Calert is satisfied, the driver must steer the vehicle 100 by themselves such that the vehicle 100 travels along the lane LN when the vehicle 100 approaches a sharp curved road. In this case, issuing an alert may make the driver feel annoyed. In contrast, if the driver is not operating the steering wheel 31 while looking aside, taking a nap, or taking their hands off the steering wheel 31, the alert is useful to the driver.

The vehicle driving support device 10 described above issues an alert regardless of whether the driver is operating the steering wheel 31 when the alert condition Calert is satisfied. However, the vehicle driving support device 10 may be configured to determine whether to issue an alert depending on whether the driver is operating the steering wheel 31 when the alert condition Calert is satisfied.

Specifically, the vehicle driving support device 10 according to the modification of the embodiment of the present disclosure determines whether a steering wheel operation condition Csteer that the driver is operating the steering wheel 31 (namely, steering wheel operation condition Csteer that the steering wheel operation of the driver is detected) is satisfied, when the alert condition Calert is satisfied.

The vehicle driving support device 10 issues an alert when the steering wheel operation condition Csteer is not satisfied. The vehicle driving support device 10 does not issue an alert when the steering wheel operation condition Csteer is satisfied. Thus, it can be said that the alert condition Calert according to the modification includes a condition that the lateral acceleration increase rate Rgy is equal to or larger than the predetermined increase rate Rgy_th and a condition that the steering wheel operation of the driver is not detected.

Alternatively, when the steering wheel operation condition Csteer is not satisfied, the vehicle driving support device 10 issues an alert in a form with a high possibility of being noticed by the driver. In other words, the vehicle driving support device 10 issues an alert with a high alert level. For example, when the vehicle driving support device 10 issues an alert by outputting an alert sound from the buzzer, the vehicle driving support device 10 issues an alert with a high alert level by outputting the alert sound from the buzzer at a relatively high volume. When the steering wheel operation condition Csteer is satisfied, the vehicle driving support device 10 issues an alert in a form with a relatively low possibility of being noticed by the driver. In other words, the vehicle driving support device 10 issues an alert with a low alert level. For example, when the vehicle driving support device 10 issues an alert by outputting an alert sound from the buzzer, the vehicle driving support device 10 issues an alert with a low alert level by outputting the alert sound from the buzzer at a relatively low volume. As described above, the vehicle driving support device 10 may set the alert level to be lower when the steering wheel operation by the driver is detected than when the steering wheel operation by the driver is not detected.

Figure 5:
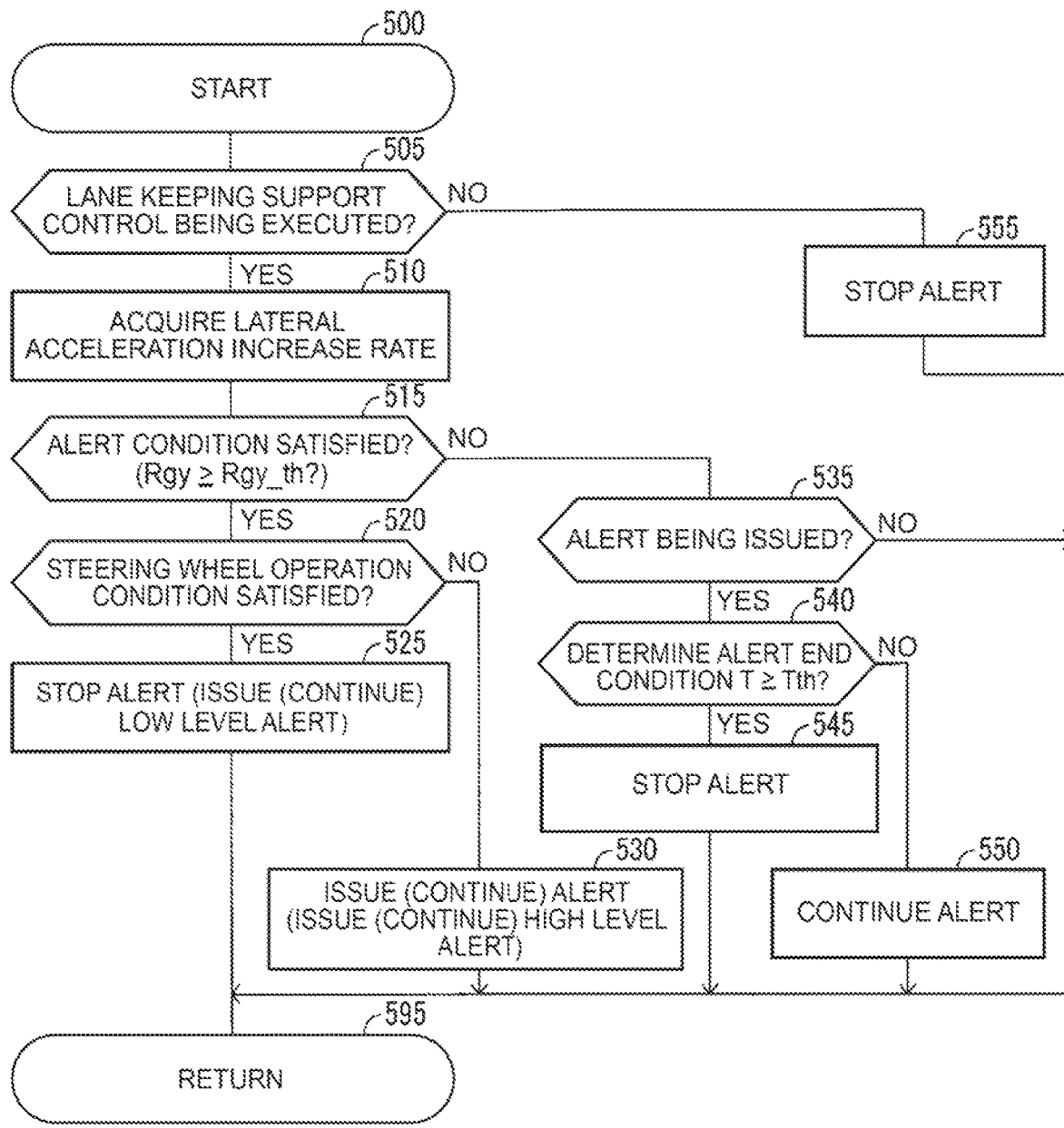
FIG. 5 is a flowchart showing a routine executed by the vehicle driving support device according to a modification of the embodiment of the present disclosure.

Next, the specific operations of the vehicle driving support device 10 according to the modification will be described. The CPU of the ECU 90 of the vehicle driving support device 10 according to the modification executes the routine shown in FIG. 5 every time a predetermined calculation time has elapsed. Thus, at a predetermined timing, the CPU starts the process from step 500 in FIG. 5, advances the process to step 505, and determines whether the lane keeping support control is being executed.

When the CPU determines "Yes" in step 505, the CPU advances the process to step 510 and acquires the lateral acceleration increase rate Rgy. Next, the CPU advances the process to step 515 and determines whether the alert condition Calert is satisfied. Specifically, the CPU determines whether the lateral acceleration increase rate Rgy acquired in step 510 is equal to or larger than the predetermined increase rate Rgy_th.

When the CPU determines "Yes" in step 515, the CPU advances the process to step 520 and determines whether the steering wheel operation condition Csteer is satisfied.

When the CPU determines "Yes" in step 520, the CPU advances the process to step 525. The CPU stops the alert when the alert is being issued, and when the alert is not being issued, the CPU maintains the state in which the alert is not being issued. Alternatively, the CPU starts the alert with a low alert level when the alert with a low alert level is not being issued, and continues the alert with a low alert level when the alert with a low alert level is being issued. Thereafter, the CPU advances the process to step 595 and temporarily ends the routine.

When the CPU determines "No" in step 520, the CPU advances the process to step 530. The CPU starts the alert when the alert is not being issued and continues the alert when the alert is being issued. Thereafter, the CPU advances the process to step 595 and temporarily ends the routine.

When the CPU determines "No" in step 515, the CPU advances the process to step 535 and determines whether the alert is being issued.

When the CPU determines "Yes" in step 535, the CPU advances the process to step 540 and determines whether the elapsed time T from the start of the alert is equal to or more than the predetermined time Tth.

When the CPU determines "Yes" in step 540, the CPU advances the process to step 545 and stops the alert. Thereafter, the CPU advances the process to step 595 and temporarily ends the routine.

When the CPU determines "No" in step 540, the CPU advances the process to step 550 and continues the alert. Thereafter, the CPU advances the process to step 595 and temporarily ends the routine.

When the CPU determines "No" in step 535, the CPU directly advances the process to step 595 and temporarily ends the routine.

When the CPU determines "No" in step 505, the CPU advances the process to step 555. The CPU stops the alert when the alert is being issued, and when the alert is not being issued, the CPU maintains the state in which the alert is not being issued. Thereafter, the CPU advances the process to step 595 and temporarily ends the routine.

The above is the specific operations of the vehicle driving support device 10 according to the modification.

What is claimed is:

1. A vehicle driving support device comprising a control unit that issues an alert to notify a driver of a vehicle that there is a possibility of occurrence of a situation in which the vehicle is not able to travel along a lane,
   wherein the control unit is configured to issue an alert notifying the driver of the vehicle that the vehicle is not able to travel along the lane without a steering wheel operation by the driver, when an alert condition that a rate of increase in a lateral acceleration of the vehicle is equal to or larger than a predetermined rate of increase is satisfied.

2. The vehicle driving support device according to claim 1, wherein the control unit is further configured to:
   set a level of the alert to a first value when a steering wheel operation by the driver is detected; and
   set the level of the alert to a second value when the steering wheel operation by the driver is not detected,
      wherein the first value is less than the second value.

3. The vehicle driving support device according to claim 1, wherein the alert condition includes a condition that a steering wheel operation by the driver is not detected.

4. The vehicle driving support device according to claim 1, wherein the control unit is further configured to calculate the rate of increase in the lateral acceleration of the vehicle based on forward information obtained from at least one of a camera, object information, and a road information database.

5. A vehicle driving support device comprising a control unit that issues an alert to notify a driver of a vehicle that there is a possibility of occurrence of a situation in which the vehicle is not able to travel along a lane, wherein the control unit is configured to:
   determine that execution of lane keeping support control is requested when a predetermined operation requesting execution of the lane keeping support control is performed; and
   based on a determination that the execution of the lane keeping support control is requested, issue an alert notifying the driver of the vehicle that the vehicle is not able to travel along the lane without a steering wheel operation by the driver, when an alert condition that a rate of increase in a lateral acceleration of the vehicle is equal to or larger than a predetermined rate of increase is satisfied.

6. The vehicle driving support device according to claim 5, wherein the control unit is further configured to calculate the rate of increase in the lateral acceleration of the vehicle based on forward information obtained from at least one of a camera, object information, and a road information database.

* * * * *